(12) United States Patent
Schaller et al.

(10) Patent No.: US 12,449,325 B2
(45) Date of Patent: Oct. 21, 2025

(54) PRESSURE SENSOR ASSEMBLY

(71) Applicant: Infineon Technologies AG, Neubiberg (DE)

(72) Inventors: Rainer Markus Schaller, Saal a.d. Donau (DE); Horst Theuss, Wenzenbach (DE)

(73) Assignee: Infineon Technologies AG, Neubiberg (DE)

( * ) Notice: Subject to any disclaimer, the term of this patent is extended or adjusted under 35 U.S.C. 154(b) by 520 days.

(21) Appl. No.: 17/874,834

(22) Filed: Jul. 27, 2022

(65) Prior Publication Data
US 2023/0038134 A1    Feb. 9, 2023

(30) Foreign Application Priority Data
Aug. 9, 2021    (DE) .......................... 102021120690.1

(51) Int. Cl.
| | |
|---|---|
| *G01L 19/14* | (2006.01) |
| *B81B 7/00* | (2006.01) |
| *G01L 19/00* | (2006.01) |
| *G01L 19/06* | (2006.01) |

(52) U.S. Cl.
CPC .......... *G01L 19/147* (2013.01); *B81B 7/0048* (2013.01); *G01L 19/0069* (2013.01); *G01L 19/06* (2013.01); *G01L 19/143* (2013.01); *G01L 19/145* (2013.01); *B81B 2201/0264* (2013.01)

(58) Field of Classification Search
None
See application file for complete search history.

(56) References Cited

U.S. PATENT DOCUMENTS

| | | | | |
|---|---|---|---|---|
| 4,926,155 | A | * | 5/1990 | Colla .................. G01L 19/0645 338/42 |
| 9,446,944 | B2 | * | 9/2016 | Ernst ....................... B81B 7/007 |
| 2019/0376863 | A1 | * | 12/2019 | Syverson ............ G01L 19/0084 |

FOREIGN PATENT DOCUMENTS

| | | | | |
|---|---|---|---|---|
| DE | 102007010711 | A1 * | 9/2008 | ........... B81B 7/0048 |
| DE | 102014105861 | A1 | 10/2015 | |
| DE | 102014014103 | A1 * | 3/2016 | ......... G01L 19/0069 |
| JP | 2003042883 | | * | 2/2003 |
| JP | 2003042883 | A | | 2/2003 |

* cited by examiner

*Primary Examiner* — John E Breene
*Assistant Examiner* — Nigel H Plumb
(74) *Attorney, Agent, or Firm* — Murphy, Bilak & Homiller, PLLC

(57) ABSTRACT

In the following, a sensor assembly is described. According to an exemplary embodiment, the sensor assembly has a housing enclosing a pressure chamber filled with a medium, the housing having a first housing part and a second housing part, the first housing part being connected to the second housing part to seal the pressure chamber in a pressure-tight manner A sensor chip is arranged in the pressure chamber, substantially surrounded by the medium, and configured to measure a pressure of the medium. The sensor assembly also includes a plurality of connection pins which are fed through the first housing part (carrier) by pressure-tight bushings and which are electrically connected to the sensor chip. The sensor assembly also has stress relieving structures which are configured to mechanically decouple the first housing part and a pressure-sensitive element of the sensor chip.

20 Claims, 4 Drawing Sheets

PRESSURE SENSOR ASSEMBLY

TECHNICAL FIELD

The present invention relates to the field of pressure sensors for measuring the pressure in a medium surrounding the sensor, in particular gas pressure sensors for the high-pressure range.

BACKGROUND

In many applications, pressure sensor assemblies are e.g. screwed into the wall of a pressure vessel (housing containing a medium under pressure), for example, in order to measure the pressure of the medium in the pressure vessel. The pressure vessel can be a tank or a pipe containing the pressurized medium. The medium is usually gaseous, for which sensor elements are known that are suitable for a wide range of gases, such as hydrogen, oxygen, nitrogen, methane, compressed air, etc.

Pressure sensor assemblies—often referred to as pressure probes—contain a pressure-sensitive sensor element. The sensor element can be, for example, a diaphragm or a thin plate that undergoes a deflection dependent on the pressure of the medium, which is measured e.g. by means of strain gauges, piezoresistive thin-film sensor elements or the like. Some pressure probes contain a liquid (e.g. oil) through which the pressure applied to the diaphragm can propagate to a sensor element located in the liquid.

Sensor elements can also be integrated into (semiconductor) chips. Various designs are known for this. One example is represented by micromechanical structures integrated in silicon, so-called MEMS (microelectromechanical systems). Another example is represented by sensor elements produced by SOI (Silicon-on-Insulator) or SOS (Silicon-on-Sapphire) technology, which contain piezoresistive elements, for example. Technologies based on SiC (silicon carbide), known as SiCOI (SiC-on-Insulator), are also known for the production of integrated sensor elements for pressure measurement. In the following, sensor elements integrated into chips are referred to as sensor chips.

In high-pressure applications, a stable steel diaphragm/plate is typically used for pressure measurement, the deflection of which is measured e.g. directly (e.g. by means of strain gauges). When integrated pressure sensors are used, the mechanical coupling of the sensor to the steel diaphragm is relatively complicated (e.g. coupling by means of oil volume). Designs without a steel diaphragm are not suitable for high-pressure applications.

The inventors have set themselves the object of designing a pressure sensor assembly suitable for high-pressure applications, which allows the use of integrated pressure sensors, in particular MEMS sensor chips, and is cost-effective to produce.

SUMMARY

In the following, a sensor assembly is described. According to an exemplary embodiment, the sensor assembly has a housing enclosing a pressure chamber filled with a medium, the housing having a first housing part and at least one second housing part, and the first housing part being connected to the second housing part in order to seal the pressure chamber in a pressure-tight manner A sensor chip is arranged in the pressure chamber, substantially surrounded by the medium, and configured to measure a pressure of the medium. The sensor assembly also comprises a plurality of connection pins which are fed through the first housing part (carrier) by means of pressure-tight bushings and which are electrically connected to the sensor chip. The sensor assembly also has stress relieving structures which are configured to mechanically decouple the first housing part and a pressure-sensitive element of the sensor chip.

According to a further exemplary embodiment, the sensor assembly has a housing enclosing a pressure chamber filled with a medium, the housing having a first housing part and at least one second housing part, and the first housing part being connected to the second housing part in order to seal the pressure chamber in a pressure-tight manner A sensor chip is arranged in the pressure chamber and configured to measure a pressure of the medium directly in contact with the medium, wherein a plurality of connection pins are fed through the first housing part by means of pressure-tight bushings and are electrically connected to the sensor chip. The sensor assembly also has stress relieving structures which are configured to mechanically decouple the first housing part and a pressure-sensitive element of the sensor chip, the stress relieving structures comprising an elastic adhesive layer which connects the sensor chip to the housing part.

BRIEF DESCRIPTION OF THE DRAWINGS

In the following text, exemplary embodiments are described based on illustrations. The illustrations are not necessarily true to scale and the exemplary embodiments are not limited to the aspects presented. Rather, the emphasis is placed on presenting the principles underlying the exemplary embodiments. In the drawings.

DETAILED DESCRIPTION

Figure 1:
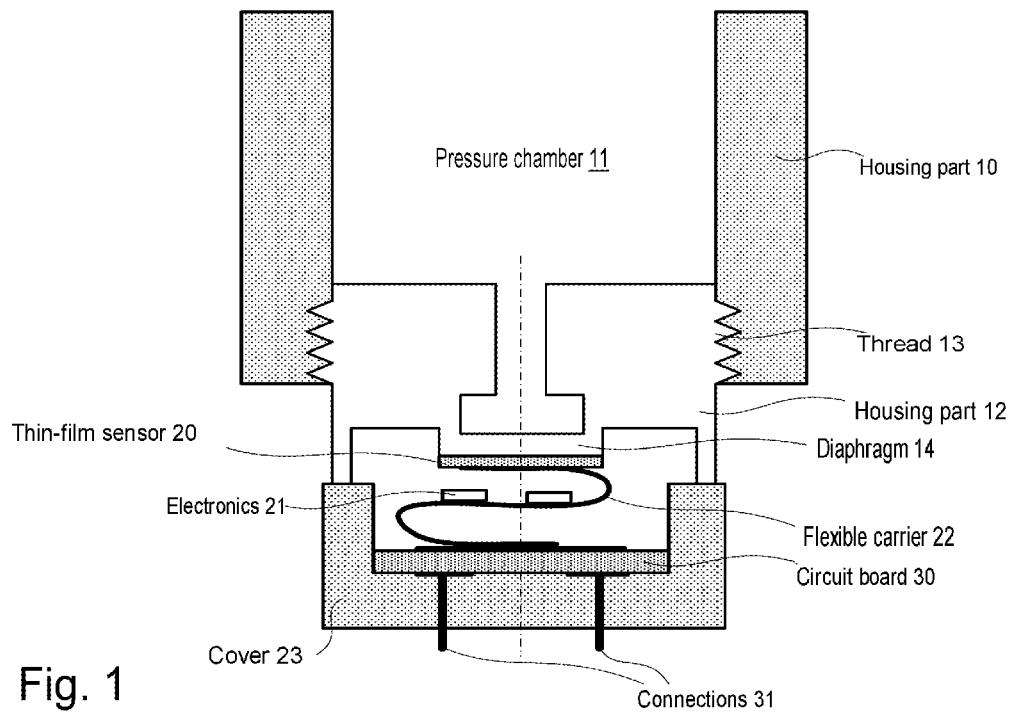
FIG. 1 illustrates an example of a conventional sensor assembly for high-pressure applications.

FIG. 1 illustrates an example of a conventional sensor assembly for high-pressure applications. The medium under pressure is located in a pressure chamber formed by a housing (e.g. a tank, a pipe, or other container). FIG. 1 shows only one part 10 of the housing. The sensor assembly comprises a carrier 12, which can be inserted into the housing part 10 forming a seal. The carrier 12 can also be considered a housing part (housing cover, closure etc.). For example, the carrier 12 is screwed into the housing part 10.

In the example shown, the carrier 12 has an external thread 13 for this purpose and the housing part 10 has a corresponding internal thread.

The carrier 12 is shaped in such a way that it has a diaphragm 14 at one point, the inside of which (that bounds the pressure chamber 11) is in contact with the medium. In this example, the diaphragm 14 is an integral component of the carrier 12, but has essentially the shape of a round disc and is arranged symmetrically with respect to the longitudinal axis of the thread 13. A thin-film sensor element 20 is arranged on the outside of the diaphragm 14 and is configured to measure the deflection of the diaphragm. This deflection depends on the pressure in the pressure chamber 11, and consequently the output signal of the sensor element 20 can be considered a measurement of the pressure in the pressure chamber 11.

The sensor element 20 is electrically connected to a circuit board 30. This connection can be produced in various ways. In this example, a flexible carrier 22 (e.g. a flexible PCB) is used, on which further electronic components 21 can be arranged. Alternatively, a connection by means of cables or wires would be possible. A cover 23 together with the carrier 22 forms a closed probe housing, which encloses the sensor element 20, the flexible carrier 22, and the printed circuit board 30. In the example shown, the printed circuit board 30 is arranged on an inside of the cover 23, wherein a plurality of connection pins/contact elements 31 can be fed from the printed circuit board 30 through the cover 23 to the outside. The connection pins can be part of a plug connector. The sensor assembly shown is suitable for high-pressure applications, because the pressure chamber is hermetically sealed by the carrier/housing part 12. The diaphragm 14 is an integral component of the carrier 12 (and not a separate component connected to the carrier 12), which can be produced from steel and is therefore sufficiently stable. The use of integrated pressure sensors (sensor chips) is not readily possible in this design.

Figure 2:
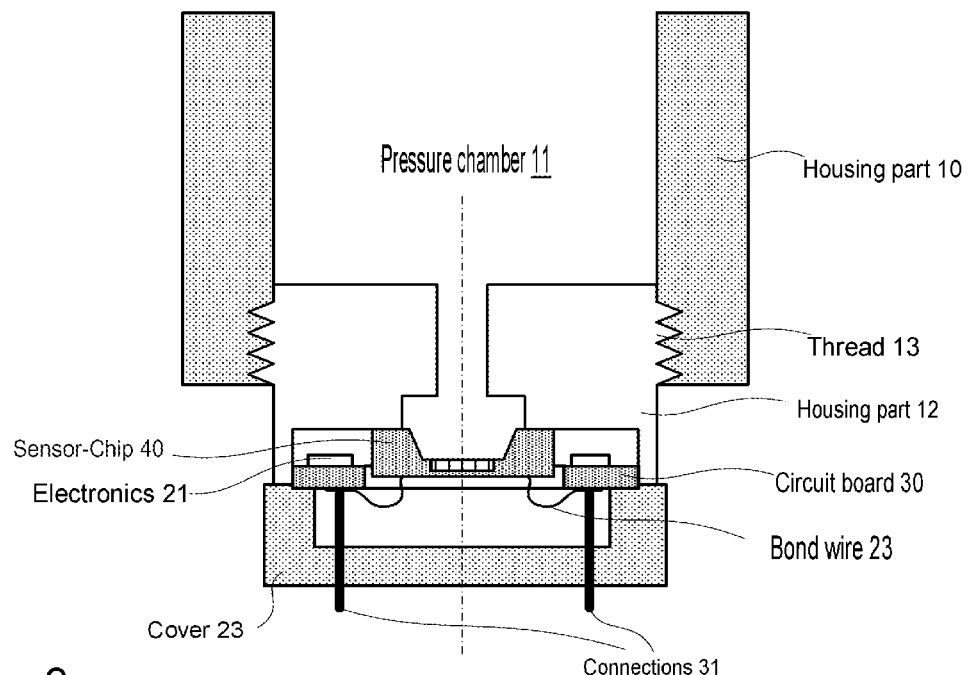
FIG. 2 illustrates an example of a sensor assembly having a micromechanical sensor element integrated into a sensor chip; the sensor assembly is not suitable for high-pressure applications due to its design.

FIG. 2 illustrates an example of a sensor assembly with a micromechanical sensor element integrated in a sensor chip. In a similar manner to the previous example, the carrier 12 is screwed into (thread 13) a housing part 12 of the housing that encloses the pressure chamber 11. However, the carrier 12 does not have a diaphragm, but a central opening along the longitudinal axis of the thread 13, this opening being closed off with a sensor chip 40. This means that the sensor chip 40 is connected to the carrier 12 (e.g. by means of adhesive) in such a way that the sensor chip 40 tightly closes the central opening of the carrier 12. The medium in the pressure chamber is thus in contact with the sensor chip 40, and in particular with the sensor element 41 integrated in it.

The sensor chip 40 can be connected to a printed circuit board 30 using bond wires 24 (or other leads/cables) as shown in FIG. 2. The printed circuit board 30 is mounted on a cover 23 which can be connected to the carrier 12 (e.g. glued, such that the sensor chip 40 and the printed circuit board 30 are enclosed, i.e. the cover 23 and carrier 12 form a probe housing in a similar way to the previous example). As in the example of FIG. 1, a plurality of connection pins/contact elements 31 are fed from the circuit board 30 through the cover 23 to the outside.

The sensor assembly in FIG. 2 is not suitable for high pressure applications. The pressure in the pressure chamber 11 exerts a force on the sensor chip 40. This force also acts on the (adhesive) connection between the carrier 12 and the sensor chip, wherein in high-pressure applications this force can be greater than the mechanical strength of the adhesive connection.

Figure 3:
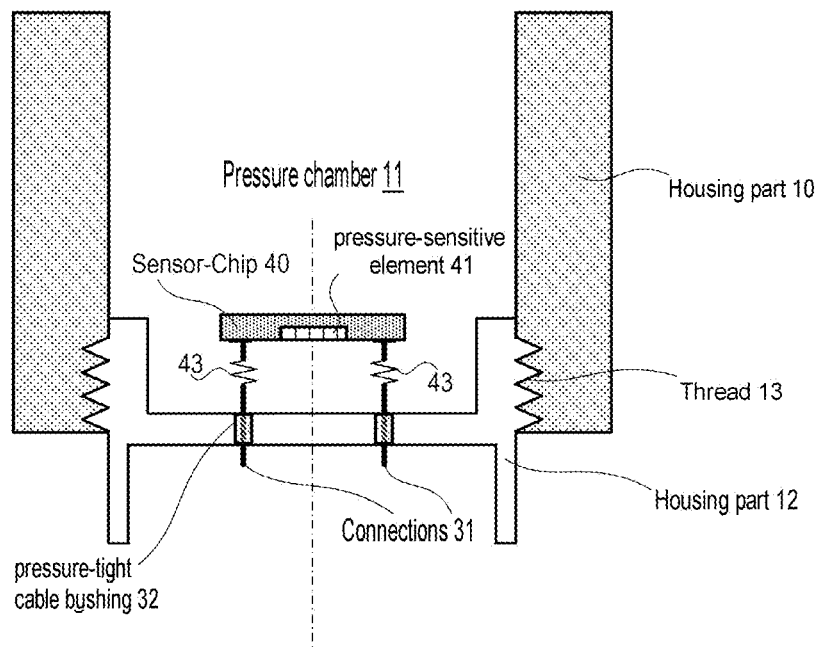
FIG. 3 illustrates a first example of a novel pressure measurement concept having an integrated sensor element which is suitable for high-pressure applications.

FIG. 3 illustrates a first exemplary implementation of a new pressure measurement concept which is suitable for high-pressure applications. As shown in FIG. 3, a carrier (housing part) 12 is inserted as described above with reference to FIG. 1 or 2 (e.g. screwed in, thread 13) into a housing part 10 which contains a pressure chamber 11 with a pressurized medium. Unlike in the example from FIG. 1, the carrier 12 does not have a thin diaphragm and unlike in the example from FIG. 2, the carrier 12 does not have an opening, but instead closes off the pressure chamber 11 in a pressure-tight manner.

A sensor chip 40 is arranged completely in the pressure chamber 11, i.e. completely surrounded by the medium in the pressure chamber 11. The sensor chip 40 is configured to measure the pressure of the medium in the pressure chamber 11. The sensor chip 40 can have in particular a MEMS (microelectromechanical system) as the pressure-sensitive sensor element 41. The MEMS sensor element 41 is located on the top of the sensor chip 40, on which metallic contact pads 42 are also arranged. A plurality of connection pins 31 are passed through a wall of the carrier 12 by means of pressure-tight bushings 32 (e.g. wire-glass bushings). The connection pins 31 contact the contact pads 42 of the sensor chip 40 in the pressure chamber 11.

In order that no (or only small) mechanical stresses are introduced into the sensor chip 40 (for example due to thermal expansion of the carrier 12), which could distort the measurement result, stress relieving structures are provided. These can be integrated into the connection pins 31 and/or into the sensor chip 40 and are configured to mechanically decouple the carrier 12 and the pressure-sensitive sensor element 41 of the sensor chip. The sensor assembly can also comprise a circuit board (not shown in FIGS. 2, 3), which is contacted with the connection pins outside the pressure chamber 11. The printed circuit board can be electrically contacted in a similar way to the previous examples. A cover can also be provided in a similar way to in the previous examples.

In the sensor assembly shown, the sensor element 41 is mounted "floating" in the pressure chamber 11 (only on the connection pins 31) and is in direct contact with the medium in the pressure chamber 11. No diaphragm is required outside the sensor chip 40 and no coupling medium (such as oil) is required. Furthermore, no reference pressure chamber (e.g. vacuum chamber) pressurized to a reference pressure is required outside the sensor chip, as is the case with some known pressure measurement designs. In the examples described here, a reference chamber is contained internally within the sensor chip.

The sensor chip 40 can consist of a silicon chip or a combination of a semiconductor and an insulator. For example, the sensor chip 40 can consist of a stack of at least one glass substrate (a glass-silicon-glass composite) and a silicon substrate, or it can be produced by means of known SOI, SOS, or SiCOI technologies. The top of the sensor chip 40 with the MEMS sensor element faces the carrier 12 in the example of FIG. 4. The sensor chip can also be mounted upside down (i.e. with its underside) on the connection pins 31. In this case, through-connections in the chip are necessary (through-silicon vias). In both cases, the sensor chip 40 is mounted at a defined distance from an inner surface of the carrier 12 and exclusively on the connection pins 31 and is surrounded on all sides by the medium of which the pressure is to be measured.

Figure 4:
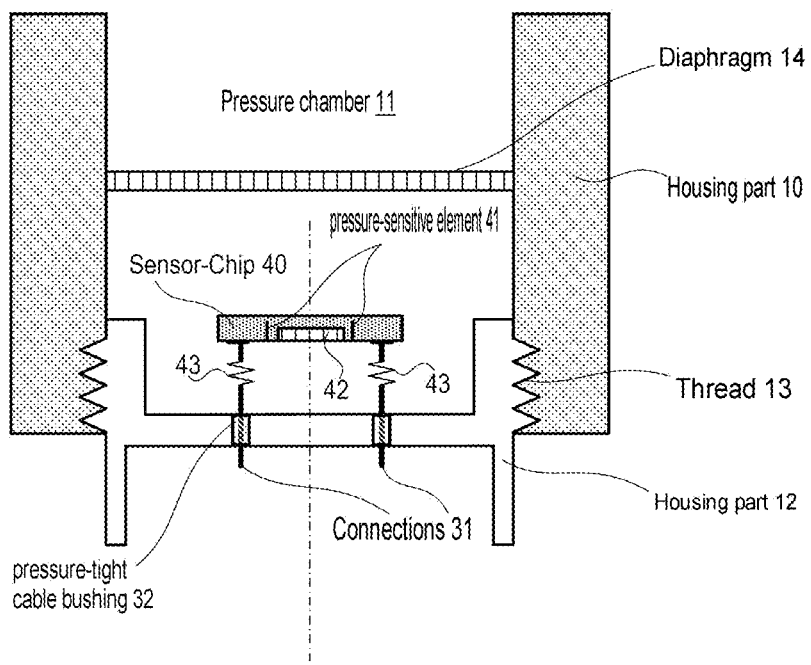
FIG. 4 illustrates an extension/supplement to the example from FIG. 3.

The stress relieving structures mentioned can comprise trenches in the sensor chip 40 that surround the pressure-sensitive element 41 and attenuate or prevent the transmission of mechanical stresses to the pressure-sensitive element 41. In addition or alternatively, the stress relieving structures may comprise spring elements 43 which are part of the connection pins 31. The spring elements 43 can be formed by a helical conductor section (see FIG. 3 or 4) or by a tapering of the connection pins 31. The spring elements 43 can also be configured in a similar way to Pogo pins. In the example of FIG. 4, a protective cap 14 is also arranged in the pressure chamber 11 to separate a section of the pressure chamber around the sensor chip 40 from the rest of the pressure chamber 11. The protective cap 14 is permeable for the medium of which the pressure is to be measured, but serves as protection against humidity (humidity protection) or as a flame arrester and/or as protection against mechanical damage. Suitable materials for the protective cap 14 are known per se and are therefore not discussed further here.

Figure 5:
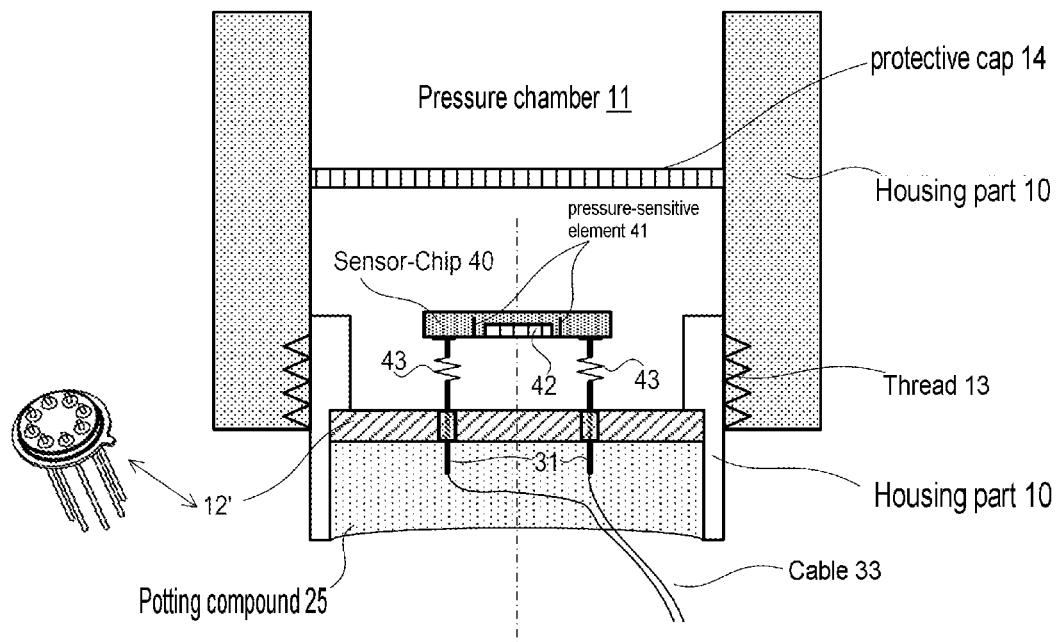
FIG. 5 illustrates a modification of the example from FIG. 4.

In the example of FIG. 5, instead of the cover 23 (cf. FIG. 2), a potting compound 25 is provided in the lower region of the carrier 12. The potting compound protects the connection pins 31 and their connection to the conductors of a cable 33. Furthermore, in the example of FIG. 5, the carrier 12 consists of two parts, namely an outer part with the external thread 13 and a so-called TO socket 12' (TO header, TO=transistor outline), which is connected to the outer part (e.g. glued, soldered or welded). The TO header 12' is a standard component that already contains the connection pins 31 and the pressure-tight cable bushings 32.

Figure 6:
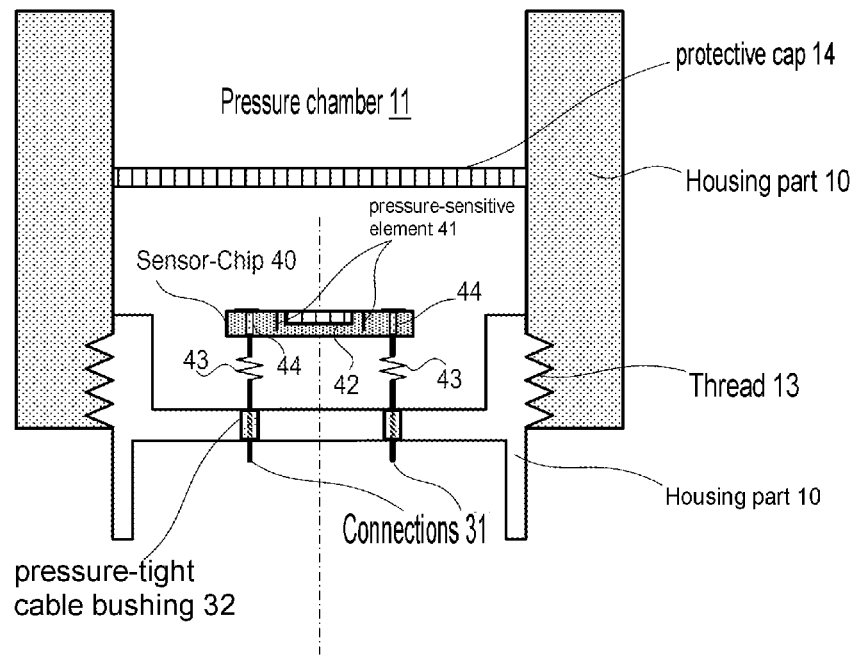
FIG. 6 illustrates another modification of the example from FIG. 4, in which the sensor chip is mounted upside down.

The example of FIG. 6 is similar to the example of FIG. 5. In FIG. 6, the connection pins 31 (with the spring elements 43) are connected to the underside of the sensor chip 40. The pressure-sensitive sensor element 41 is located on the top of the sensor chip 40 and is electrically connected to the connection pins 31 using through-silicon vias 44.

Figure 7:
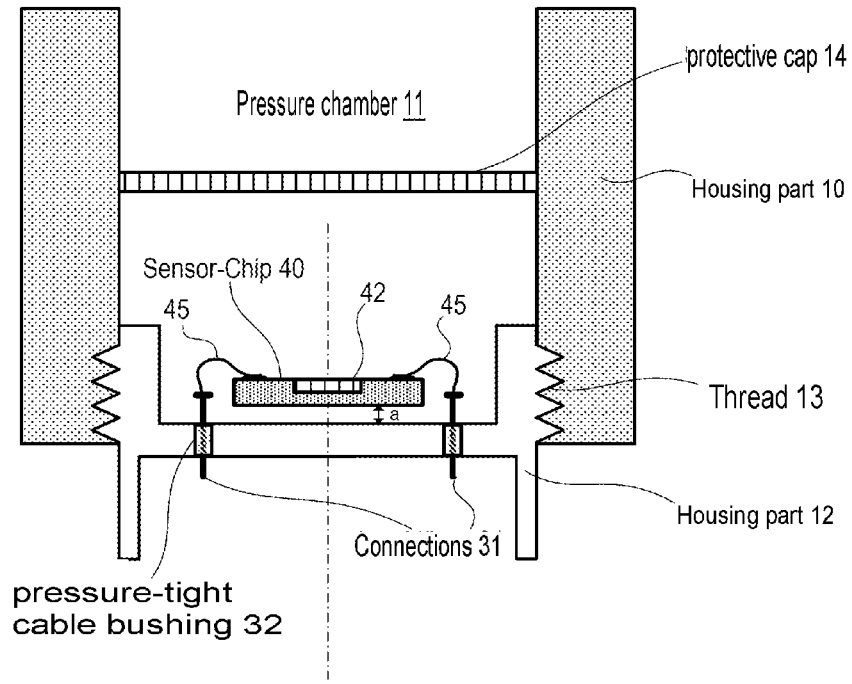
FIG. 7 illustrates an alternative example of a sensor assembly for pressure measurement having an integrated sensor element which is suitable for high-pressure applications.

FIG. 7 illustrates an alternative example of a sensor assembly for pressure measurement having an integrated sensor element which is suitable for high-pressure applications. According to FIG. 7, the sensor assembly comprises a housing having at least the housing part 10 and the housing part (carrier) 12 inserted therein. The pressure chamber 11 filled with a medium is located inside the housing. The carrier 12 seals the housing and thus the pressure chamber 11. The sensor chip 40 is arranged in the pressure chamber 11 and (apart from those points on the chip surface where the chip is electrically connected to the connection pins) is completely surrounded by the medium and is configured to measure a pressure of the medium. As already mentioned, the sensor chip 40 can have a MEMS as the pressure-sensitive element. A plurality of connection pins 31 are fed through a base (or base plate) of the carrier 12 by means of pressure-tight bushings 32, wherein the sensor chip 40 is electrically connected to the ends of the connection pins 31 via bond wires 45.

The bond wires 45 hold the sensor chip 40 in a "floating" manner at a distance a from the base plate of the carrier 12. The sensor chip 40 is therefore surrounded on all sides with the medium of which the pressure is to be measured and is only suspended on the bond wires 45. The bond wires 45 are flexible and cannot introduce any significant forces into the chip 40. For this reason, the bond wires 45 also function as a stress relieving structure, similar to the spring elements 43 in the previous examples. In this example, bond wires 45 perform the same function as the spring elements 43 in the previous examples (namely the mechanical decoupling between chip 40 and connection pins 31), and therefore the bond wires 45 can also be regarded as spring elements. The protective cap 14 and other aspects of the examples described so far can also be used in the context of the example of FIG. 7.

Figure 8:
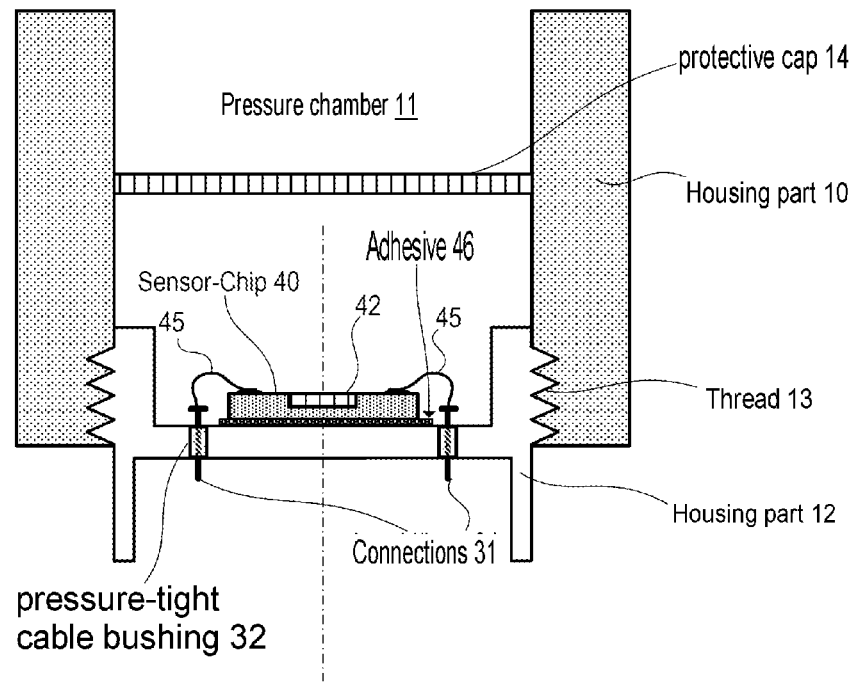
FIG. 8 illustrates a modification of the example from FIG. 7.

FIG. 8 illustrates a modification of the example from FIG. 7. In this case, the sensor chip 40 is not suspended in a "floating" manner on the bond wires 45, but is connected to the carrier 12 by means of an elastic adhesive layer 46. In the example shown in FIG. 8, the sensor chip 40 is glued to the inside of the base of the carrier/housing part 12. The adhesive layer 46 is elastic, i.e. it has a stiffness that is significantly lower than the stiffness of the carrier 12 or the sensor chip 40. In comparison to the adhesive layer 46, the sensor chip 46 and the carrier 12 can be considered to be virtually rigid (inelastic). This means that the adhesive layer 46 can also be considered to be part of the stress relieving structure, because it is not suitable for transferring mechanical stresses from the carrier 12 into the chip 40. The soft, elastic adhesive layer 46 mechanically decouples the chip 40 and the carrier 12 so that no mechanical stresses are transferred and corresponding strains can be absorbed by the adhesive layer 46.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A sensor assembly, comprising:
   a housing enclosing a pressure chamber filled with a medium, the housing having a first housing part and a second housing part, the first housing part being connected to the second housing part to seal the pressure chamber in a pressure-tight manner;
   a sensor chip arranged in the pressure chamber, surrounded by the medium, and configured to measure a pressure of the medium;
   a plurality of connection pins fed through the first housing part by pressure-tight bushings and electrically connected to the sensor chip; and
   stress relieving structures configured to mechanically decouple the first housing part and a pressure-sensitive element of the sensor chip.

2. The sensor assembly of claim 1, wherein the sensor chip has a capacitive or piezoresistive MEMS as the pressure-sensitive element, and wherein the medium is a gas.

3. The sensor assembly of claim 1, wherein the sensor chip is in direct contact with the medium.

4. The sensor assembly of claim 1, wherein the pressure-sensitive element comprises a reference chamber integrated inside the sensor chip.

5. The sensor assembly of claim 1, wherein the stress relieving structures are integrated into the connection pins and/or the sensor chip.

6. The sensor assembly of claim 1, wherein the stress relieving structures are attached to the connection pins.

7. The sensor assembly of claim 1, wherein the stress relieving structures comprise trenches in the sensor chip that surround the pressure-sensitive element and attenuate or prevent transmission of mechanical stresses to the pressure-sensitive element.

8. The sensor assembly of claim 1, wherein the stress relieving structures comprise spring elements which are a component of the connection pins.

9. The sensor assembly of claim 8, wherein the spring elements are formed by a helical conductor section of the connection pins.

10. The sensor assembly of claim 8, wherein the spring elements are formed by a tapering of the connection pins.

11. The sensor assembly of claim 1, wherein the stress relieving structures comprise bond wires that connect the connection pins to the sensor chip such that the sensor chip is only suspended on the bond wires and is a distance from an inner surface of the first housing part.

12. The sensor assembly of claim 1, wherein the sensor chip is a distance from an inner surface of the first housing part and is mounted exclusively on the connection pins.

13. The sensor assembly of claim 1, wherein the connection pins are mechanically and electrically connected to corresponding connection pads of the sensor chip.

14. The sensor assembly of claim 1, further comprising:
a protective cap which bounds part of the pressure chamber,
wherein the sensor chip is located between the first housing part and the protective cap.

15. The sensor assembly of claim 14, wherein the protective cap contains a flame arrester and/or humidity protection.

16. The sensor assembly of claim 1, wherein the sensor chip has a stack of at least one glass substrate and one silicon substrate.

17. The sensor assembly of claim 1, wherein the sensor chip is completely surrounded by the medium, except for surface regions of the chip that are connected to the connection pins.

18. A sensor assembly, comprising:
a housing enclosing a pressure chamber filled with a medium, the housing having a first housing part and a second housing part, the first housing part being connected to the second housing part to seal the pressure chamber in a pressure-tight manner;
a sensor chip arranged in the pressure chamber and configured to measure a pressure of the medium directly in contact with the medium;
a plurality of connection pins fed through the first housing part by pressure-tight bushings and electrically connected to the sensor chip; and
stress relieving structures configured to mechanically decouple the first housing part and a pressure-sensitive element of the sensor chip,
wherein the stress relieving structures comprise an elastic adhesive layer which connects the sensor chip to the second housing part.

19. The sensor assembly of claim 18, wherein the connection pins are part of a plug connector.

20. The sensor assembly of claim 1, wherein the connection pins are part of a plug connector.

* * * * *

UNITED STATES PATENT AND TRADEMARK OFFICE
CERTIFICATE OF CORRECTION

| | | |
|---|---|---|
| PATENT NO. | : 12,449,325 B2 | Page 1 of 1 |
| APPLICATION NO. | : 17/874834 | |
| DATED | : October 21, 2025 | |
| INVENTOR(S) | : R. Schaller et al. | |

It is certified that error appears in the above-identified patent and that said Letters Patent is hereby corrected as shown below:

On the Title Page

Item (57)/abstract (Line 7), please change "manner A" to -- manner. A --.

Signed and Sealed this
Sixteenth Day of December, 2025

John A. Squires
*Director of the United States Patent and Trademark Office*